(12) United States Patent
Feng

(10) Patent No.: US 11,288,987 B2
(45) Date of Patent: Mar. 29, 2022

(54) FOLDABLE DISPLAY DEVICE

(71) Applicant: Wuhan China Star Optoelectronics Semiconductor Display Technology Co., Ltd., Hubei (CN)

(72) Inventor: Zikang Feng, Hubei (CN)

(73) Assignee: Wuhan China Star Optoelectronics Semiconductor Display Technology Co., Ltd., Hubei (CN)

( * ) Notice: Subject to any disclaimer, the term of this patent is extended or adjusted under 35 U.S.C. 154(b) by 253 days.

(21) Appl. No.: 16/623,181

(22) PCT Filed: Nov. 7, 2019

(86) PCT No.: PCT/CN2019/116267
§ 371 (c)(1),
(2) Date: Dec. 16, 2019

(87) PCT Pub. No.: WO2021/051500
PCT Pub. Date: Mar. 25, 2021

(65) Prior Publication Data
US 2021/0366319 A1 Nov. 25, 2021

(30) Foreign Application Priority Data
Sep. 16, 2019 (CN) .......................... 201910868815.4

(51) Int. Cl.
*G09F 9/00* (2006.01)
*G09F 9/30* (2006.01)
*G06F 1/16* (2006.01)

(52) U.S. Cl.
CPC ............ *G09F 9/301* (2013.01); *G06F 1/1641* (2013.01); *G06F 1/1675* (2013.01)

(58) Field of Classification Search
CPC ...... G09F 9/301; G06F 1/1641; G06F 1/1675; H01L 27/3274; H01L 51/0097
See application file for complete search history.

(56) References Cited

U.S. PATENT DOCUMENTS 7,426,107 B2 * 9/2008 Yeh ........................ G06F 1/1626
340/815.4
8,380,327 B2 * 2/2013 Park ........................ G05B 11/01
700/1

(Continued)

FOREIGN PATENT DOCUMENTS

| CN | 105405363 A | 3/2016 |
| CN | 106254589 A | 12/2016 |

(Continued)

OTHER PUBLICATIONS

CN105405363 A; English Translation (Year: 2016).*
CN 207571644 U; English Translation (Year: 2017).*

*Primary Examiner* — Pete T Lee
(74) *Attorney, Agent, or Firm* — Taft Stettinius & Hollister LLP

(57) ABSTRACT

The present application discloses a foldable display device, including a display panel including a bendable region; a supporter disposed under the display panel to support the display panel, the supporter including a bending portion located below the bendable region, a buffer space formed between the bending portion and the bendable region; and an air pump mounted on the supporter, and in communication with the buffer space.

16 Claims, 2 Drawing Sheets

(56) References Cited

U.S. PATENT DOCUMENTS

2006/0038745 A1* 2/2006 Naksen ................ G06F 1/1637
345/30
2018/0116061 A1 4/2018 Xu

FOREIGN PATENT DOCUMENTS

| | | |
|---|---|---|
| CN | 107316568 A | 11/2017 |
| CN | 108269496 A | 7/2018 |
| CN | 207571644 U | 7/2018 |
| CN | 109272875 A | 1/2019 |
| CN | 110136585 A | 8/2019 |
| JP | S58137820 A | 8/1983 |

* cited by examiner

FOLDABLE DISPLAY DEVICE

CROSS-REFERENCE TO RELATED APPLICATIONS

This application is a U.S. National Phase of International PCT Application No. PCT/CN2019/116267 filed Nov. 7, 2019, which claims the benefit of Chinese Patent Application Serial No. 201910868815.4 filed Sep. 16, 2019, the contents of each application are incorporated herein by reference in their entirety.

BACKGROUND OF INVENTION

Field of Invention

The present application relates to a field of display technologies, and in particular, to a foldable display device.

Description of Prior Art

Organic light emitting diode (OLED) display panel have advantages of lightweight and thinness, bendability, foldability, etc., and are widely used in foldable display devices such as foldable mobile phones and smart watches.

An existing foldable display device generally includes a flexible display panel and a supporter configured to support the flexible display panel, wherein the supporter has a lower position limit on a bending region of the flexible display panel to prevent the bending region of the flexible display panel from being damaged by the pressing of the supporter during the bending of the foldable display device.

In the prior art, the supporter has a lower position limit on the bending region of the flexible display panel, so that the bending region of the flexible display panel is prone to wrinkling after multiple folding, thereby impacting display effect of the flexible display panel.

SUMMARY OF INVENTION

The present application provides a foldable display device, which aims to improve a structure of the foldable display device, avoid the problem that a bendable region of the display panel is easily wrinkled after being folded multiple times, and improve a display effect of the foldable display device.

The present application provides a foldable display device, including: a display panel including a bendable region; a supporter disposed under the display panel to support the display panel, the supporter including a bending portion located below the bendable region, a buffer space formed between the bending portion and the bendable region; the bending portion provided with a connection hole, and the connection hole formed with an opening on an upper surface of the bending portion, so that one end of the connection hole is in communication with the buffer space; an air pump mounted on the supporter, and in communication with another end of the connection hole; and a reinforcing plate disposed below the bendable region.

In some embodiments, the foldable display device further includes a first controller coupled to the air pump, the first controller configured to receive a flattening signal from the bendable region and control the air pump to draw at least a portion of gas in the buffer space.

In some embodiments, the first controller is further configured to receive a bending signal from the bendable region and control the air pump to charge the buffer space with gas.

In some embodiments, the supporter is provided with an inflation hole and controls a valve for controlling opening or closing of the inflation hole, one end of the inflation hole is in communication with the buffer space, another end of the inflation hole is in communication with outside air; and the foldable display device further includes a second controller coupled to the valve, the second controller configured to receive a bending signal from the bendable region and control opening of the valve.

The present application further provides a foldable display device, including: a display panel, including a bendable region; a supporter disposed under the display panel to support the display panel, the supporter including a bending portion located below the bendable region, a buffer space formed between the bending portion and the bendable region; and an air pump mounted on the supporter, and in communication with another end of the connection hole.

In some embodiments, the bending portion is provided with a connection hole, one end of the connection hole is in communication with the buffer space, and another end of the connection hole is in communication with the valve.

In some embodiments, the connection hole is formed with an opening on an upper surface of the bending portion, so that one end of the connection hole is in communication with the buffer space.

In some embodiments, the foldable display device further includes a plurality of connection holes, wherein the plurality of connection holes are formed with openings on the upper surface of the bending portion, and the plurality of the openings are evenly distributed on the upper surface of the bending portion.

In some embodiments, the bending portion includes a plurality of sub-bending portions sequentially distributed along a length direction of the foldable display device, and each of the sub-bending portions is opened with one of the connection holes.

In some embodiments, the connection holes include a first hole section extending downward from an upper surface of the sub-bending portion and a second hole section extending along a length direction of the foldable display device, the first hole section and the second hole section are in communication with each other, and the air pump is in communication with the second hole section.

In some embodiments, The foldable display device further includes a first controller coupled to the air pump, the first controller configured to receive a flattening signal from the bendable region and control the air pump to draw at least a portion of gas in the buffer space.

In some embodiments, the first controller is further configured to receive a bending signal from the bendable region and control the air pump to charge the buffer space with gas.

In some embodiments, the foldable display device further includes a sensor coupled to the first controller, the sensor is configured to send a flattening signal from the bendable region to the first controller when a folding angle of the bendable region greater than or equal to 175° is detected by the sensor.

In some embodiments, the sensor is configured to send a flattening signal from the bendable region to the first controller when a folding angle of the bendable region smaller than 175° is detected by the sensor.

In some embodiments, the supporter is provided with an inflation hole and controls a valve for controlling opening or closing of the inflation hole, one end of the inflation hole is in communication with the buffer space, another end is in communication with outside air; and the foldable display device further includes a second controller coupled to the valve, the second controller configured to receive a bending signal from the bendable region and control opening of the valve.

In some embodiments, the foldable display device further includes a reinforcing plate disposed below the bendable region.

In some embodiments, the reinforcing plate is attached to a lower surface of the bendable region.

In some embodiments, the reinforcing plate is a metal foil or a plastic foil.

In some embodiments, a side of the bendable region is further provided with a seal, and the seal joins the bendable region and the bending portion, to seal a gap between the side of the bendable region and the bending portion.

In some embodiments, the seal extends along a length direction of the foldable display device.

In the foldable display device of the present application, a buffer space is formed between the bendable portion of the display panel and the bending portion of the supporter, and an air pump is disposed on the supporter, such that the air pump is communicated with the buffer space. When the foldable display device is folded, the buffer space under the bendable region of the display panel allows the bendable region to be bent freely without being squeezed by the supporter. When the foldable display device is flattened, the air pump can be controlled to draw at least part of gas in the buffer space to form a negative pressure in the buffer space, and the bendable region of the display panel is attached to an upper surface of the bending portion of the supporter under an action of the external atmospheric pressure, thereby avoiding the problem that a bendable region of the display panel is easily wrinkled after being folded multiple times, and improving a display effect of the foldable display device.

BRIEF DESCRIPTION OF DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

Figure 1:
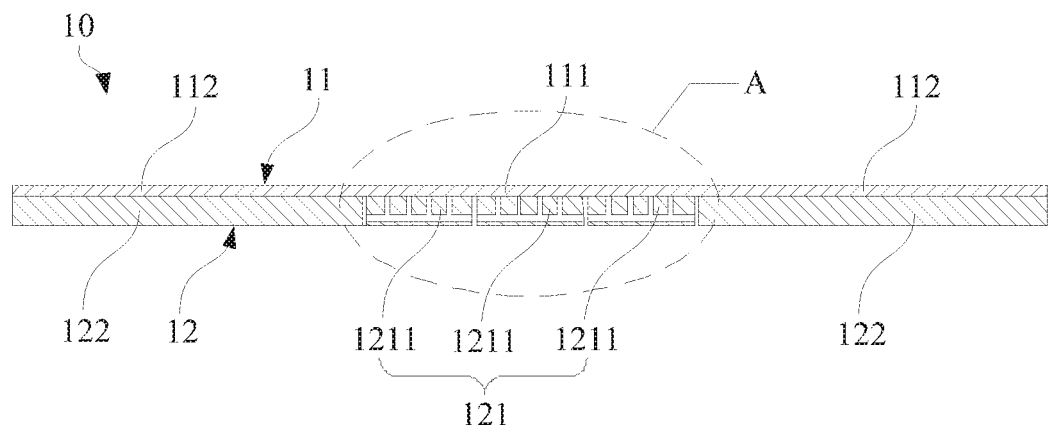
FIG. 1 is a cross-sectional view showing a foldable display device flattened along a length direction of the foldable display device according to one embodiment of the present application.

Foldable display device 10; display panel 11; bendable region 111; non-bending region 112; supporter 12; bending portion 121; sub-bending portion 1211; fixed supporter 122; connection hole 1213; first hole section 1213a; second hole section 1213b; buffer space 13; reinforcing plate 14; seal 15.

DETAILED DESCRIPTION OF PREFERRED EMBODIMENTS

The technical solutions in the present application are clearly and completely described in the following with reference to the drawings in the present application. It is obvious that the described embodiments are only a part of the embodiments of the present application, and not all of the embodiments. All other embodiments obtained by a person skilled in the art based on the embodiments of the present application without creative efforts are within the scope of the present application.

In the description of the present invention, it is to be understood that the terms "center", "lateral", "upper", "lower", "left", "right", "vertical", "horizontal", "top", "bottom", "inside", "outside" and the like are based on the orientation or positional relationship shown in the drawings, and is merely for the convenience of describing the present invention and simplifying the description, and does not indicate or imply that the indicated devices or components must to be in particular orientations, or constructed and operated in a particular orientation, and thus are not to be construed as limiting the invention. Furthermore, the terms "first", "second", etc. in the specification and claims of the present invention and the above figures are used to distinguish similar objects, and are not necessarily used to describe a specific order or prioritization. It should be understood that the objects so described are interchangeable when it is appropriate. Moreover, the terms "including" and "having" and any variations thereof are intended to cover a non-exclusive "inclusion".

In the present application, the word "exemplary" is used to mean "serving as an example, instance, or illustration." Any embodiment described in this application as "exemplary" is not necessarily to be construed as preferred or advantageous over other embodiments. To enable any person skilled in the art to make and use the present application, the following description is presented. In the following description, details are set forth for the purpose of explanation. It will be appreciated that those skilled in the art will recognize that the present invention can be practiced without the specific details. In other instances, well-known structures and procedures are not described in detail to avoid unnecessary detail. Therefore, the present application is not intended to be limited to the embodiments shown, but is in accord with the broad scope of the principles and features disclosed herein.

The present application provides a foldable display device. The details are described below separately.

Figure 2:
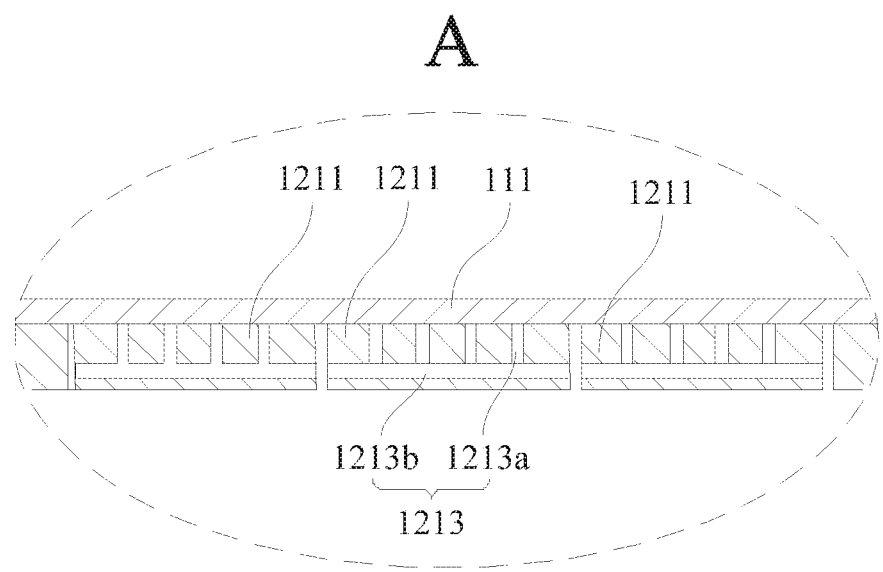
FIG. 2 is an enlarged view of the region A in FIG. 1.

Referring to FIGS. 1 and 2, the foldable display device 10 includes a display panel 11, a supporter 12, and an air pump (not shown). The supporter 12 is disposed below the display panel 11 to support the display panel 11, and the air pump is mounted on the supporter 12.

The display panel 11 includes a bendable region 111, and the supporter 12 includes a bending portion 121 located below the bendable region 111. When the foldable display device 10 is bent, the bendable region 111 of the display panel 11 and the bending portion 121 of the supporter 12 is simultaneously bent so that the foldable display device 10 is integrally bent.

Optionally, the bendable region 111 of the display panel 11 is located at a middle portion of the display panel 11, and opposite sides of the bendable region 111 are also adjoined to the non-bending regions 112. Correspondingly, the bending portion 121 of the supporter 12 is also located in the middle of the supporter 12, and opposite sides of the bending portion 121 are connected to fixed supporters 122, respectively, wherein the fixed supporters 122 are located below the non-bending region 112, and connected to a lower surface of a non-bending region 112 to support the non-bending region 112.

Of course, the bendable region 111 of the display panel 11 may also be located at an end or other portions of the display panel 11. In addition, a number of the bendable regions 111 of the display panel 11 may also be one or more, and even the display panel 11 as a whole may be bent. Then, the bending portion 121 of the supporter 12 also needs to be adjusted accordingly, and details are not repeated herein for brevity.

Figure 3:
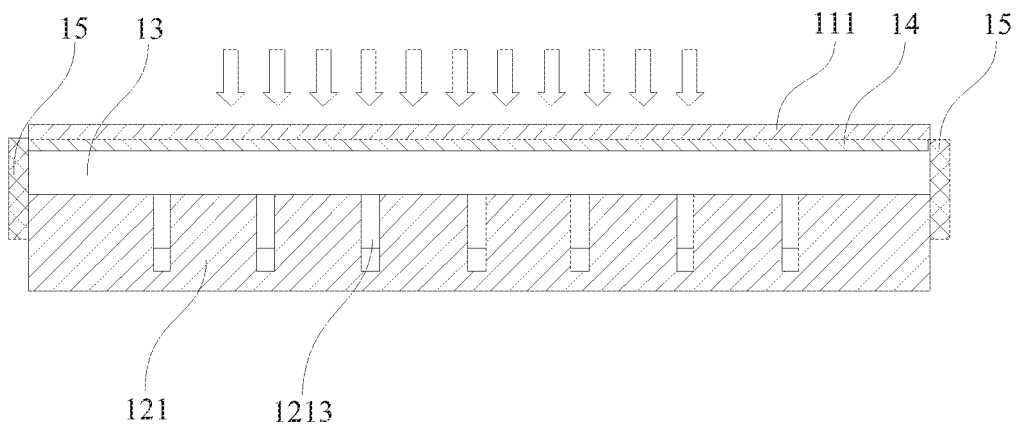
FIG. 3 is a cross-sectional view of a foldable display device, taken along a width direction of the foldable display device according to one embodiment of the present application.

In some embodiments, as shown in FIG. 3, a buffer space 13 may be formed between the bending portion 121 of the supporter 12 and the bendable region 111 of the display panel 11, and the air pump mounted on the supporter 12 is in communication with the buffer space 13. Thus, when the foldable display device 10 is folded, the buffer space 13 under the bendable region 111 of the display panel 11 allow the bendable region 111 to be bent freely without being squeezed by the supporter 12. When the foldable display device 10 is flattened, the air pump can be controlled to draw at least part of gas in the buffer space 13 to form a negative pressure in the buffer space 13, and the bendable region 111 of the display panel 11 is attached to an upper surface of the bending portion 121 of the supporter 12 under an action of the external atmospheric pressure, thereby avoiding the problem that a bendable region 111 of the display panel 11 is wrinkled after being folded multiple times, and improving a display effect of the foldable display device 10.

It should be noted that the air pump is in communication with the buffer space 13 so that an air inlet of the air pump is in communication with the buffer space 13, and the air outlet of the air pump is in communication with the outside atmospheric pressure. When the foldable display device 10 is flattened, the air pump can be controlled to forward rotate, to extract at least a portion of the gas in the buffer space 13. When the foldable display device 10 is folded, an impeller of the air pump is reversely rotated to pump the gas in the air pump into the buffer space 13. Alternatively, the air pump is controlled to stop working, so that the buffer space 13 is kept in communication with the outside atmospheric pressure through the air pump, and air pressure in the buffer space 13 is consistent with the external atmospheric pressure, facilitating bending of the bendable region 111 of the display panel 11. Of course, air outlet of the air pump may alternatively be in communication with the buffer space 13, and the air inlet of the air pump is in communication with the outside atmospheric pressure. In this case, when the foldable display device 10 is flattened, the air pump is controlled to reversely rotate, to extract the air in the buffer space 13 through the air outlet. When the foldable display device 10 is folded, the air pump is controlled to rotate forward or the air pump is controlled to stop working, so that outside air enters the buffer space 13.

In some embodiments, the bending portion 121 of the supporter 12 may be opened with a connection hole 1213, and one end of the connection hole 1213 is in communication with the buffer space 13 and another end is in communication with the air pump, facilitating communication between the air pump and the buffer space 13.

The connection hole 1213 may be formed with an opening on the upper surface of the bending portion 121 such that one end of the connection hole 1213 is in communication with the buffer space 13. Thus, when the air pump is controlled to extract the air in the buffer space 13, the bendable region 111 of the display panel 11 is attached to an upper surface of the bending portion 121 of the supporter 12 by the external atmospheric pressure, and the opening of the connection hole 1213 is blocked to maintain a stable negative pressure state in the connection hole 1213, so that the bendable region 111 of the display panel 11 is stably attached to the upper surface of the bending portion 121 of the supporter 12.

In some embodiments, a number of the connection holes 1213 may be plural, and the plurality of connection holes 1213 are formed with openings on the upper surface of the bending portion 121, and the plurality of openings are evenly distributed on the upper surface of the bending portion 121. As such, the external atmospheric pressure is uniformly applied to the upper surface of the bendable region 111 of the display panel 11, so that respective portions of the bendable region 111 of the display panel 11 are maintained to be attached with the upper surface of the bending portion 121 of the supporter 12.

The openings of the plurality of connection holes 1213 may be distributed in an array on the upper surface of the bending portion 121 or may be irregularly distributed on the upper surface of the bending portion 121, which is not particularly limited herein.

Figure 4:
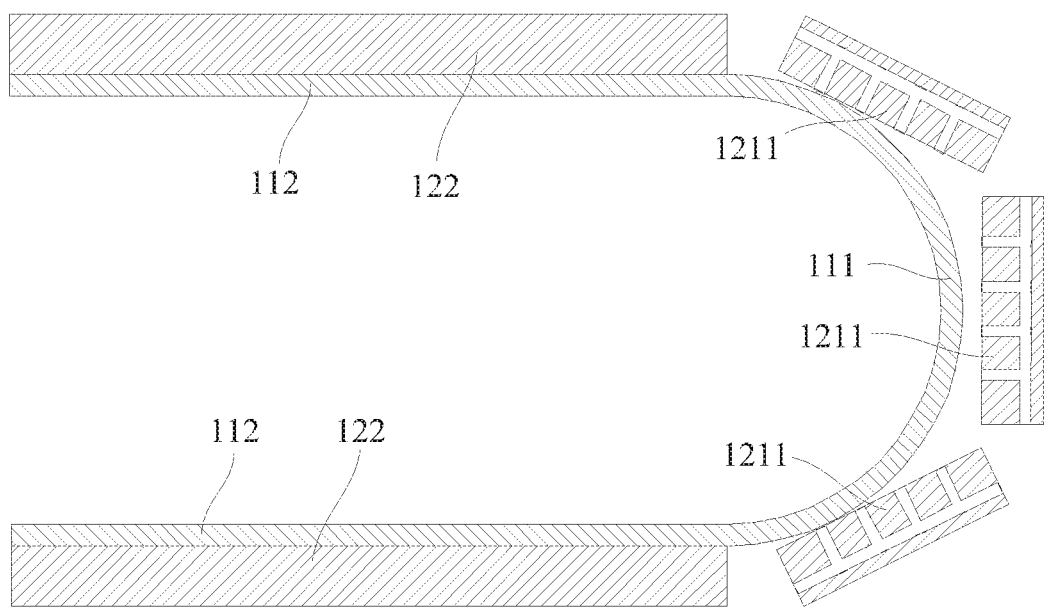
FIG. 4 is a cross-sectional view of the foldable display device as it is folded, taken along a length direction of the foldable display device according to one embodiment of the present application.

In some embodiments, as shown in FIGS. 1, 2 and 4, the bending portion 121 of the supporter 12 includes a plurality of sub-bending portions 1211 sequentially distributed along a length direction of the foldable display device 10, and each of the sub-bending portions 1211 is formed with a connection hole 1213 thereon. The connection hole includes a first hole section 1213a extending downward from an upper surface of the sub-bending portion 1211, and a second hole section 1213b extending along a length direction of the foldable display device 10, the first hole section 1213a and the second hole section 1213b are in communication with each other, and the air pump is in communication with the second hole section 1213b. Alternatively, the second hole section 1213b is formed with an opening at an end of the sub-bending portion 1211, and the air pump is mounted on the fixed supporter 122 of the supporter 12 and in communication with the opening of the second hole section 1213b through an air pipe.

The adjacent ones of the sub-bending portions 1211 can be relatively bent to reduce the risk of damage of the bending portions 121 of the foldable display device 10 after multiple bending.

Of course, the air pump can also be in communication with the buffer space 13 by other means. For example, a through hole (not shown) may be formed in the fixed supporter 122 of the supporter 12, and one end of the through hole is in communication with the air pump and another end is in communication with the buffer space 13. In this case, the through hole on the fixed supporter 122 is formed with an opening on a sidewall of the buffer space 13 along a length direction of the foldable display device 10.

In some embodiments, as shown in FIG. 3, the foldable display device 10 may further include a reinforcing plate 14 disposed under the bendable region 111 to separate the lower surface of the bendable region 111 of the display panel 11 from the upper surface of the bending portion 121 of the supporter 12, which avoids impression mark or damage of the bendable region 111 of the display panel 11 caused by long-term contact of an edge of the opening of the connection hole 1213 formed on the upper surface of the bending portion 121 with the bendable portion 111 of the display panel 11 after the bendable portion 111 of the display panel 11 is adhered to the bending portion 121 of the supporter 12.

Optionally, the reinforcing plate 14 may be attached to the lower surface of the bendable region 111 to increase the strength of the bendable region 111 of the display panel 11.

The reinforcing plate 14 may be a sheet structure having a good bending property such as a metal foil or a plastic foil to avoid the problem that the reinforcing plate 14 is damaged after repeated bending of the bendable region 111.

In addition, a thickness of the reinforcing plate 14 may be less than or equal to 35 μm to reduce an overall thickness of the foldable display device 10. Meanwhile, the bendable region 111 of the display panel 11 squeezed by the reinforcing panel 14 during folding of the foldable display device 10 is prevented.

In some embodiments, the foldable display device 10 can further include a first controller (not shown) coupled to the air pump, the first controller configured to receive a flattening signal from the bendable region and control the air pump to draw at least a portion of gas in the buffer space 12, such that the bendable region 111 of the display panel 11 is attached to the bending portion 121 of the supporter 12. The flattening signal from the bendable region refers to a signal generated when the bendable region 111 of the display panel 11 is flattened.

Specifically, when the foldable display device 10 is flattened, a button (not shown) or a sensor (not shown) on the foldable display device 10 may send the flattening signal from the bendable region to the first controller. After receiving the flattening signal of the bendable region, the first controller controls the operation of the air pump, so that the air pump draws at least part of the gas in the buffer space 13, and thus the bendable region 111 of the display panel 11 is attached to the bending portion 121 of the supporter 12 under an action of the external atmospheric pressure, thereby avoiding the problem that a bendable region 111 of the display panel 11 is wrinkled.

In some embodiments, the first controller is further configured to receive a bending signal from the bendable region and control the air pump to charge the buffer space 13 with gas, to make the bendable region 111 of the display panel 11 and the bending portion 121 of the supporter 12 disengaged from the attached state, and when the foldable display device 10 is folded, the bendable region 111 of the display panel 11 is pressed by the bending portion 121 of the supporter 12. The bending signal from the bendable region refers to a signal generated when the bendable region 111 of the display panel 11 is bent.

Specifically, when the foldable display device 10 is bent, a button or a sensor on the foldable display device 10 may send the bent signal from the bendable region to the first controller. After receiving the bending signal of the bendable region, the first controller controls the operation of the air pump, so that the air pump charges the buffer space 13 with gas, and thus the force of the external atmospheric pressure on the bendable region 111 of the display panel 11 is reduced or eliminated, and the bendable region 111 of the display panel 11 and the bending portion 121 of the supporter 12 can be disengaged from the attached state.

The sensor may be an infrared sensor or any other sensor capable of detecting the bending angle of the bending portion 121 of the supporter 12. The sensor coupled to the first controller sends a bendable region flattening signal to the first controller when a folding angle of the bendable region greater than or equal to 175° is detected by the sensor. The sensor coupled to the first controller sends a bending signal from the bendable region to the first controller when a folding angle of the bendable region smaller than 175° is detected by the sensor.

In other embodiments, an inflation hole (not shown) and a valve (not shown) for controlling opening or closing of the inflation hole may be provided on the supporter 12, wherein one end of the inflation hole is in communication with the buffer space 13, and another end is in communication with the outside air. When the foldable display device 10 is folded, the valve can be controlled to open, so that the atmospheric pressure in the buffer space 13 is consistent with the external atmospheric pressure, and the bendable region 111 of the display panel 11 may be freely bent without being squeezed by the supporter 12. When the foldable display device 10 is flattened, the air pump can be controlled to draw at least part of gas in the buffer space 13 to form a negative pressure in the buffer space 13, and the bendable region 111 of the display panel 11 is attached to an upper surface of the bending portion 121 of the supporter 12 under an action of the external atmospheric pressure, thereby avoiding the problem that a bendable region 111 of the display panel 11 is wrinkled after being folded multiple times, and improving a display effect of the foldable display device 10.

Optionally, the foldable display device 10 includes a second controller coupled to the valve for receiving a bending signal from the bendable region and controlling the valve to open.

A bending signal from the bendable region or flattening signal from the bendable region can be transmitted to the second controller through a button on the foldable display device 10 or a sensor disposed in the foldable display device 10.

Optionally, the second controller is further configured to receive a flattening signal from the bendable region and control the valve to close. A flattening signal from the bendable region can be transmitted to the second controller by a button on the foldable display device 10 or a sensor disposed within the foldable display device 10.

Of course, it is also possible to control the opening or closing of the valve by mechanical means. For example, a push structure can be provided on the supporter 12. When the foldable display device 10 is folded, the push structure pushes the valve to open the valve; and when the foldable display device 10 is flattened, the push structure pushes the valve to close the valve.

In some embodiments, one end of the inflation hole may be in communication with the connection hole 1213 and another end may be in communication with the outside atmosphere. Thus, when the air pump makes the bendable region absorbed to be attached to the upper surface of the bending portion 121 of the supporter 12 through the connection hole, the air pressure in the connection hole 1213 and the external atmospheric pressure can be consistent by opening the valve, to release the adsorption effect of the connection hole 1213 to the bendable region 111 of the display panel 11.

In some embodiments, as shown in FIG. 3, a seal 15 may be disposed on a side of the bendable region 111, and the seal 15 is connected between the bendable region 111 and the bending portion 121, to seal a gap between the side of the bendable region 111 and the bending portion 121. When the air pump draws out the gas in the buffer space 13, the seal can prevents the outside air from flowing into the buffer space 13 through the gap between the side of the bendable region 111 and the bending portion 12, resulting in a failure of forming a negative pressure in the buffer space 13. Further, the seal also can prevent external dust from entering the buffer space 13 and impacting the display effect of the display panel 11.

A number of the seals 15 is two, and both of the seals 15 extend along the length direction of the foldable display device 10 to improve the sealing effect of the seal 15.

In the above-mentioned embodiments, the descriptions of the various embodiments are different, and the detailed description of the other embodiments which is omitted can be referred to the above content and are not repeated herein for brevity.

In the specific implementation, the foregoing various units or structures may be implemented as a separate entity, or may be implemented in any combination, as the same or several entities. The specific implementation of the above various units or structures can be referred to the foregoing descriptions for the above method embodiments, and are not repeated herein for brevity.

The specific implementation of the foregoing operations can be referred to the foregoing embodiments, and details are not repeated herein for brevity.

The above detailed description of a foldable display device is provided by the present application. The principles and implementations of the present application are described in the specific embodiments. The description of the above embodiments is only used to help understand the method of the present application. At the same time, those skilled in the art will have any changes in the specific embodiments and application scope according to the idea of the present application. In summary, the content of this specification should not be construed as limiting the present application.

What is claimed is:

1. A foldable display device, comprising:
   a display panel comprising a bendable region;
   a supporter disposed under the display panel to support the display panel, the supporter comprising a bending portion located below the bendable region, a buffer space formed between the bending portion and the bendable region; the bending portion provided with a connection hole, and the connection hole formed with an opening on an upper surface of the bending portion, so that one end of the connection hole is in communication with the buffer space;
   an air pump mounted on the supporter, and in communication with another end of the connection hole;
   a reinforcing plate disposed below the bendable region;
   a first controller coupled to the air pump, the first controller configured to receive a flattening signal from the bendable region and control the air pump to draw at least a portion of gas in the buffer space, wherein the supporter is provided with an inflation hole and controls a valve for controlling opening or closing of the inflation hole, one end of the inflation hole is in communication with the buffer space, another end of the inflation hole is in communication with outside air; and
   a second controller coupled to the valve, the second controller configured to receive a bending signal from the bendable region and control opening of the valve.

2. The foldable display device of claim 1, wherein the first controller is further configured to receive a bending signal from the bendable region and control the air pump to charge the buffer space with gas.

3. A foldable display device, comprising:
   a display panel, comprising a bendable region;
   a supporter disposed under the display panel to support the display panel, the supporter comprising a bending portion located below the bendable region, a buffer space formed between the bending portion and the bendable region, wherein the bending portion is provided with a connection hole, one end of the connection hole is in communication with the buffer space;
   an air pump mounted on the supporter, and in communication with another end of the connection hole,
   a first controller coupled to the air pump, the first controller configured to receive a flattening signal from the bendable region and control the air pump to draw at least a portion of gas in the buffer space, wherein the supporter is provided with an inflation hole and controls a valve for controlling opening or closing of the inflation hole, one end of the inflation hole is in communication with the buffer space, another end is in communication with outside air; and
   a second controller coupled to the valve, the second controller configured to receive a bending signal from the bendable region and control opening of the valve.

4. The foldable display device according to claim 3, wherein the another end of the connection hole is in communication with the valve.

5. The foldable display device according to claim 4, wherein the connection hole is formed with an opening on an upper surface of the bending portion, so that one end of the connection hole is in communication with the buffer space.

6. The foldable display device according to claim 5, further comprising a plurality of connection holes, wherein the plurality of connection holes are formed with openings on the upper surface of the bending portion, and the plurality of the openings are evenly distributed on the upper surface of the bending portion.

7. The foldable display device of claim 6, wherein the bending portion comprises a plurality of sub-bending portions sequentially distributed along a length direction of the foldable display device, and each of the sub-bending portions is opened with one of the connection holes.

8. The foldable display device of claim 7, wherein each of the connection holes comprises a first hole section extending downward from an upper surface of the sub-bending portion and a second hole section extending along a length direction of the foldable display device, the first hole section and the second hole section are in communication with each other, and the air pump is in communication with the second hole section.

9. The foldable display device of claim 3, wherein the first controller is further configured to receive a bending signal from the bendable region and control the air pump to charge the buffer space with gas.

10. The foldable display device of claim 9, wherein the foldable display device further comprises a sensor coupled to the first controller, the sensor is configurated to send a flattening signal from the bendable region to the first controller when a folding angle of the bendable region greater than or equal to 175° is detected by the sensor.

11. The foldable display device of claim 10, wherein the sensor is configured to send a flattening signal from the bendable region to the first controller when a folding angle of the bendable region smaller than 175° is detected by the sensor.

12. The foldable display device of claim 3, further comprising a reinforcing plate disposed below the bendable region.

13. The foldable display device of claim 12, wherein the reinforcing plate is attached to a lower surface of the bendable region.

14. The foldable display device of claim 12, wherein the reinforcing plate is a metal foil or a plastic foil.

15. The foldable display device of claim 3, wherein a side of the bendable region is further provided with a seal, and the seal joins the bendable region and the bending portion, to seal a gap between the side of the bendable region and the bending portion.

16. The foldable display device of claim 15, wherein the seal extends along a length direction of the foldable display device.

\* \* \* \* \*